United States Patent
Hoover

(10) Patent No.: US 12,537,389 B2
(45) Date of Patent: Jan. 27, 2026

(54) APPARATUS AND METHOD FOR WIRELESS CHARGING CABLE COILS

(71) Applicant: Honda Motor Co., Ltd., Tokyo (JP)

(72) Inventor: Andrew R. Hoover, West Liberty, OH (US)

(73) Assignee: HONDA MOTOR CO., LTD, Tokyo (JP)

(*) Notice: Subject to any disclaimer, the term of this patent is extended or adjusted under 35 U.S.C. 154(b) by 594 days.

(21) Appl. No.: 17/559,764

(22) Filed: Dec. 22, 2021

(65) Prior Publication Data

US 2023/0198299 A1  Jun. 22, 2023

(51) Int. Cl.
*H02J 50/00* (2016.01)
*H02J 50/10* (2016.01)
*H02J 50/90* (2016.01)

(52) U.S. Cl.
CPC ........... *H02J 50/005* (2020.01); *H02J 50/10* (2016.02); *H02J 50/90* (2016.02)

(58) Field of Classification Search
CPC ........... H02J 50/005; H02J 50/90; H02J 50/10
USPC ........................................................ 307/115
See application file for complete search history.

(56) References Cited

U.S. PATENT DOCUMENTS

| | | | | |
|---|---|---|---|---|
| 5,426,264 | A * | 6/1995 | Livingston | H01B 7/292 174/110 FC |
| 7,525,283 | B2 * | 4/2009 | Cheng | H01F 41/0226 320/108 |
| 9,276,437 | B2 * | 3/2016 | Partovi | H02J 7/0044 |
| 11,222,745 | B2 * | 1/2022 | Matsumoto | B60M 7/00 |
| 12,003,113 | B2 * | 6/2024 | Jia | H02J 50/90 |
| 2001/0003415 | A1 * | 6/2001 | Kutsuzawa | H02J 50/10 320/108 |
| 2002/0117320 | A1 * | 8/2002 | Hyogo | H01F 5/06 174/68.1 |
| 2012/0104999 | A1 * | 5/2012 | Teggatz | H02J 7/00034 336/200 |
| 2014/0084699 | A1 * | 3/2014 | Sugino | H01F 38/14 307/104 |
| 2018/0212488 | A1 * | 7/2018 | Kuehhirt | H01F 5/06 |
| 2018/0294096 | A1 * | 10/2018 | Peng | H01F 27/2823 |
| 2020/0119576 | A1 * | 4/2020 | Lee | H01F 27/2804 |

FOREIGN PATENT DOCUMENTS

| | | |
|---|---|---|
| CN | 103532257 A | 1/2014 |
| CN | 103872800 A | 6/2014 |
| CN | 208690077 U | 4/2019 |
| CN | 208939667 U | 6/2019 |
| CN | 111128525 A | 5/2020 |
| CN | 210692326 U | 6/2020 |
| CN | 212084819 U | 12/2020 |

(Continued)

*Primary Examiner* — Alfonso Perez Borroto
(74) *Attorney, Agent, or Firm* — Armstrong Teasdale LLP

(57) ABSTRACT

A wireless charging device for use in providing electrical power to one or more portable electronic devices is provided. The wireless charging device includes a ferrous core and a housing surrounding the ferrous core. The housing includes a plurality of guides that align a cable. When the cable is aligned in the plurality of guides and a current is passed through the cable, the cable and the ferrous core act as a transmission coil to transmit power from an electrical power source to at least one receiving coil in a first portable electronic device.

20 Claims, 7 Drawing Sheets

(56) References Cited

FOREIGN PATENT DOCUMENTS

| CN | 112735763 A | 4/2021 |
| CN | 213815702 U | 7/2021 |
| TW | 202036607 A | 10/2020 |

\* cited by examiner

APPARATUS AND METHOD FOR WIRELESS CHARGING CABLE COILS

BACKGROUND

The present disclosure relates generally to wireless charging coils, and more particularly to methods and systems for coiling charging cables to allow for wirelessly charging an electronic device.

Known portable electronic devices, e.g., without limitation, smartphones, tablets, netbooks, e-readers, PDAs, and other similar devices have become increasingly prevalent in modern society. Many such electronic devices are battery powered, such as by a lithium ion battery, in order to enable the electronic device to be operated while detached from a power source. However, known battery powered devices must be periodically recharged for continuous use, because batteries lose charge during operation of the electronic device. In known systems, recharging the electronic device may include attaching the battery of the electronic device to an electrical power source through a cable or wire. In more recently known systems, a wireless charging device charges the battery using inductive coils that do not require a direct physical connection. More specifically, known wireless charging devices transmit electrical power from a charging coil in the wireless charging device to a receiving coil in the electronic device.

However, sometimes a user has more than one device to charge at a time or the user does not have the proper cable to charge the device. Different electronic devices require different cables with different connectors. For example, Apple devices use a lightning connector while Android devices use a type of USB connector. These different connectors are not compatible with each other, so if a user has a USB connector cable, they would be unable to charge an Apple device, and vise versa. Accordingly, it would be useful to have a method for charging devices independent of the type of charging cable possessed.

BRIEF DESCRIPTION

In one aspect, a wireless charging device for use in providing electrical power to one or more portable electronic devices is provided. The wireless charging device includes a ferrous core and a housing surrounding the ferrous core. The housing includes a plurality of guides that align a cable. When a cable is aligned in the plurality of guides and a current is passed through the cable, the cable and the ferrous core act as a transmission coil to transmit power from an electrical power source to at least one receiving coil in a first portable electronic device.

In another aspect, a wireless charging system is provided. The wireless charging system includes one or more portable electronic devices. A first portable electronic device of the one or more portable electronic devices includes at least one receiving coil and a battery. The wireless charging system also includes cable and a wireless charging device including a ferrous core. The wireless charging system is configured to have the cable coiled in proximity to the ferrous core. The cable and the wireless charging device act as a transmission coil configured to be inductively coupled to the at least receiving coil.

The features, functions, and advantages described herein may be achieved independently in various embodiments of the present disclosure or may be combined in yet other embodiments, further details of which may be seen with reference to the following description and drawings.

DETAILED DESCRIPTION

The methods and systems described herein provide for wirelessly charging portable electronic devices using coiled charging cables. More specifically, the systems described herein enable a ferrous core device that allows a user to coil a charging cable to wirelessly charge a first device while charging a second device via the wired connection. In particular, as described further within, the ferrous core uses the current through the coiled cable to generate an electromagnetic field to wirelessly charge a nearby electronic device.

In some embodiments, a charging cable is manually wrapped around a ferrous core. In other embodiments, the charging cable is coiled proximate to one or more ferrous cores. When a current is applied to the charging cable, the current and the ferrous core cause the coiled cable to act as an inductive coil to generate an electromagnetic field that allows for the wireless charging of a nearby electronic device. In many embodiments, to apply a current through the charging cable, one end of the charging cable is connected to a power source, and the other end of the charging cable is connected to a second electronic device that is being charged through the cable. In some embodiments, instead of being connected to a second electronic device, the cable is connected to a cap that creates a circuit to return the power provided by the power source to create a current through the charging cable.

As used herein, an element or step recited in the singular and preceded with the word "a" or "an" should be understood as not excluding plural elements or steps, unless such exclusion is explicitly recited. Furthermore, references to one "implementation" or one "embodiment" of the subject matter described herein are not intended to be interpreted as excluding the existence of additional implementations that also incorporate the recited features. The following detailed description of implementations consistent with the principles of the disclosure refers to the accompanying drawings. In the absence of a contrary representation, the same reference numbers in different drawings may identify the same or similar elements.

As used herein, the term "inductive coil" refers to any coil that transmits or receives electrical power through induction. In particular, an inductive coil may be either a receiving coil or a transmission coil.

Figure 1:
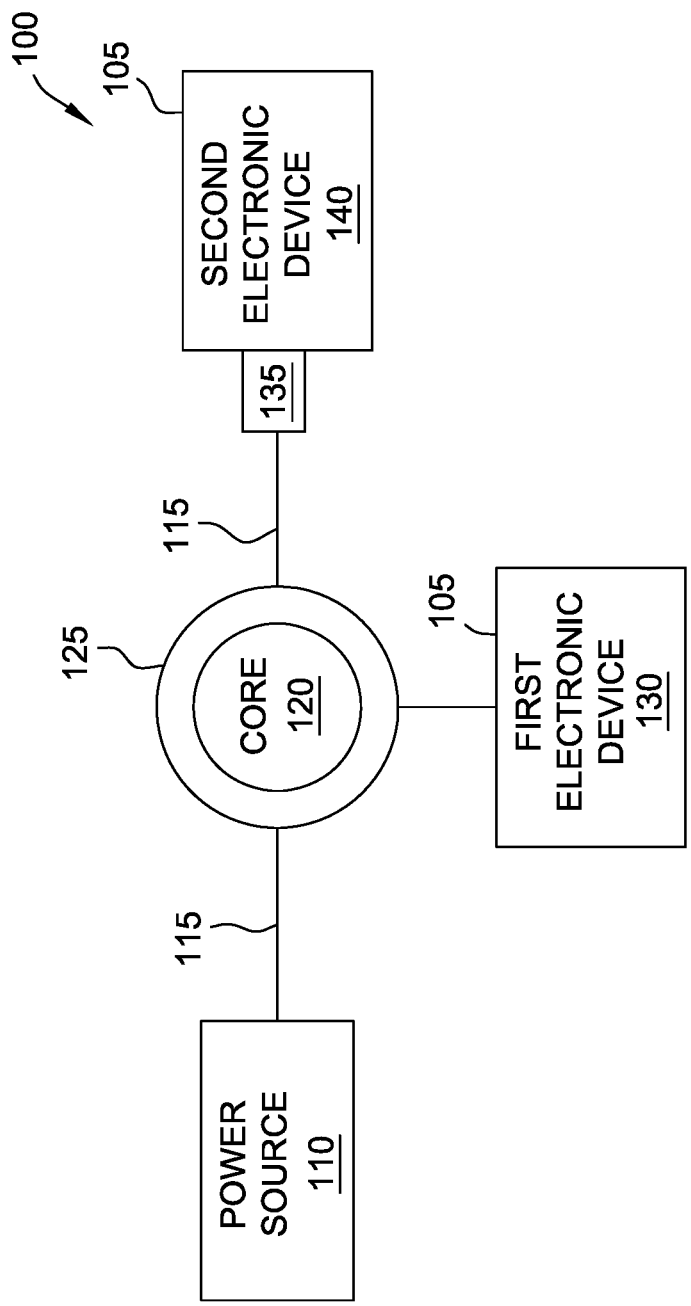
FIG. 1 is a schematic illustration of an exemplary wireless charging system that may be used to charge one or more portable electronic devices.

FIG. 1 is a schematic illustration of a wireless charging system 100 that charges one or more portable electronic devices 105. The portable electronic devices 105 include any portable electronics powered by a battery, examples include, but are not limited to, a laptop computer, a personal digital assistant (PDA), a cellular phone, a smartphone, a tablet, a phablet, an e-reader, a netbook, or other similar electronic device. In the exemplary embodiment, wireless charging system 100 includes an electrical power source 110, such as, without limitation, a wall outlet, a car battery, and/or any other device that provides electrical power, removably coupled to a charging cable 115. The charging cable 115 is wound around or near a core 120, which can be made of or include ferrous or iron materials.

The wound portion of the charging cable 115 acts as a transmission coil 125. Transmission coil 125 transmits electrical power to a receiving coil in the first electronic device 130. The first electronic device 130 receives the electrical power and stores the power in a battery coupled with the receiving coil. The ferrous or iron materials in the core 120 can be used to shape the magnetic field produced to induce current in the receiver coil in the electronic device 130. In the exemplary embodiment, the charging cable 115 is detachable from and independent of the core 120.

In system 100, the charging cable 115 is removably attached to a second electronic device 140 via a connector 135. The charging cable 115 provides power from the electrical power source 110 to the second electronic device 140 to charge one or more batteries of the second electronic device 140. The connector 135 may include, but is not limited to, at least one of USB Type A, USB Type C, USB mini B, lightning, USB micro B super speed, or other electronic connector.

In the exemplary embodiment, the core 120 and/or the power source 110 are integrated with a vehicle, such as, without limitation, an automobile, truck, car, van, aircraft, and/or boat. Alternatively, the core 120 may be located anywhere that enables wireless charging system 100 to operate as described herein.

Figure 2:
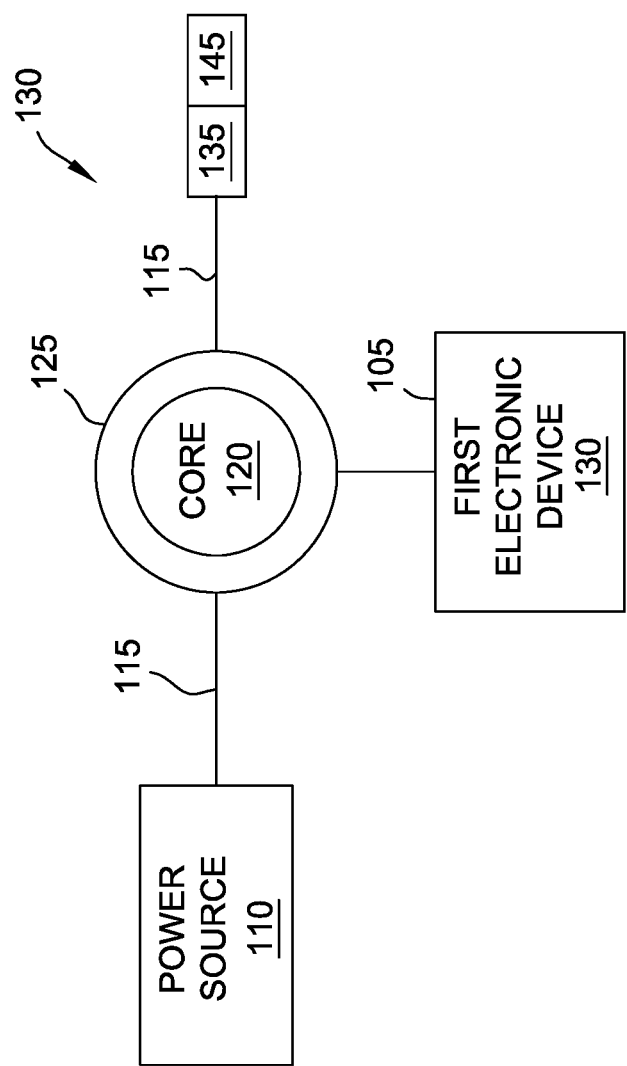
FIG. 2 is a schematic illustration of an alternative exemplary wireless charging system that may be used to charge one or more portable electronic devices.

FIG. 2 is a schematic illustration of an alternative exemplary wireless charging system 200 that may be used to charge one or more portable electronic devices 105. In FIG. 2, the second electronic device 140 (shown in FIG. 1) has been replaced with a cap 145. The cap 145 attaches to the connector 135 to provide a circuit through the charging cable 115 to allow a current to flow through the charging cable 115 and generate the electromagnetic field to charge the first electronic device 130.

For the purposes of use, the user can wrap the charging cable 115 around the core 120 to create the coil 125 to charge the first electronic device 130. The user can also unwrap the charging cable 115 from the core 120 and completely separate the charging cable 115 from the core 120. The user can then use a different charging cable 115 to wrap around the core 120. The core 120 is completely independent from either charging cable 115.

Figure 3:
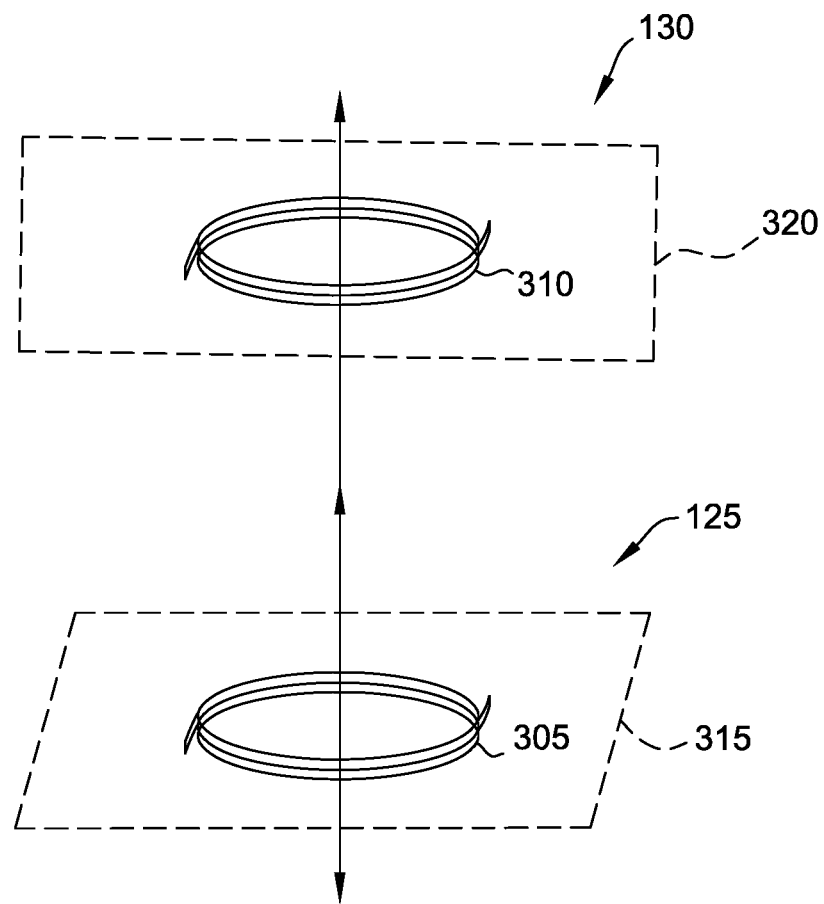
FIG. 3 is an internal view of an exemplary transmission coil and receiving coil that may be used with the wireless charging systems shown in FIGS. 1 and 2.

FIG. 3 is an internal view of inductive coils 305 and 310 that may be used with wireless charging systems 100 and 200 (shown in FIGS. 1 and 2). More specifically, FIG. 3 illustrates transmission coil 305, which is a coil 125, in a parallel position with respect to receiving coil 310, which is a part of first electronic device 130. Transmission coil 305 defines a transmission coil plane 315 and receiving coil 310 defines a receiving coil plane 320. Transmission coil plane 315 and receiving coil plane 320 are substantially parallel to allow for efficient power transmission between the inductive coils 305 and 310.

For the coil 125 to act as the transmission coil 305, the charging cable 115 needs to have a current flowing through it. In the exemplary embodiment, this requires one of the ends of the charging cable 115 to be connected to the power source 110 (shown in FIG. 1) and the other end of the charging cable to be connected to the second electronic device 140 (shown in FIG. 1) to complete the circuit and provide a current. In other embodiments, the second electronic device 140 can be replaced with a cap 145 (shown in FIG. 2) or other device that causes the circuit to complete and thereby causing current to flow through the transmission coil 305 to provide power to the receiving coil 310 of the first electronic device 130.

Figure 4:
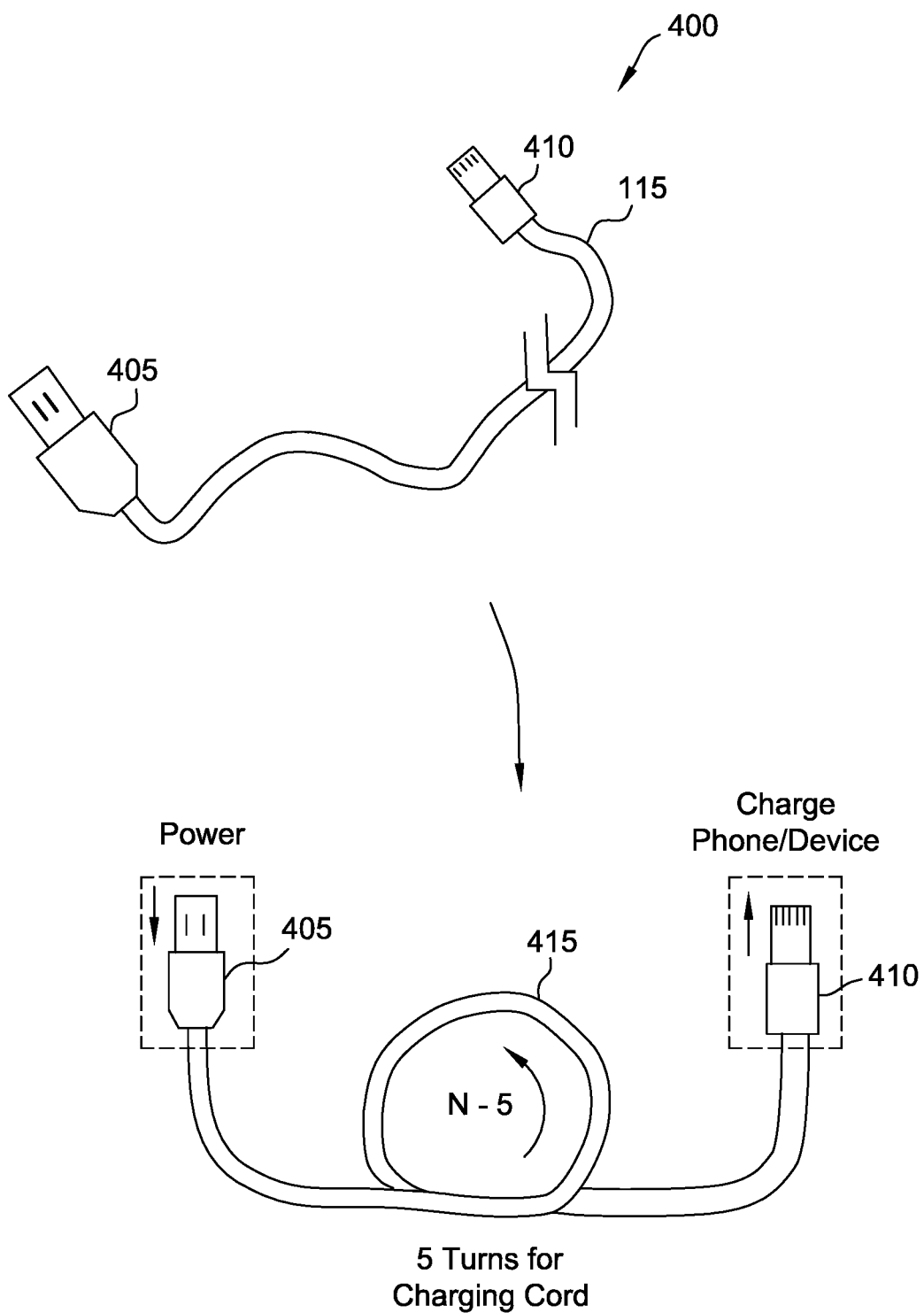
FIG. 4 is an illustration of transforming a charging cable into the wireless charging systems shown in FIGS. 1 and 2.

FIG. 4 is an illustration of transforming a charging cable 115 into the wireless charging systems 100 and 200 (shown in FIGS. 1 and 2). In the exemplary embodiment, the charging cable 115 includes one or more conductive wires wrapped in non-conductive materials. The charging cable 115 also includes two connectors 135 (shown in FIG. 1). The connectors 135 include a first connector 405 on a first end of the charging cable 115 and a second connector 410 on a second and opposite end of the charging cable 115. The first connector 405 is electrically connected to the second connector 410 by the one or more conductive wires.

The charging cable 115 is formed into multiple loops 415. In some embodiments, there are five loops 415. However in other embodiments, the number of loops 415 may vary either increasing or decreasing. In some of these embodiments, the number of loops 415 may vary based on the material in the core 120 (shown in FIG. 1), the diameter of the loops 415, the materials in the charging cable 115, the amount of current being transmitted through the charging cable 115, and/or other factors.

Figure 5:
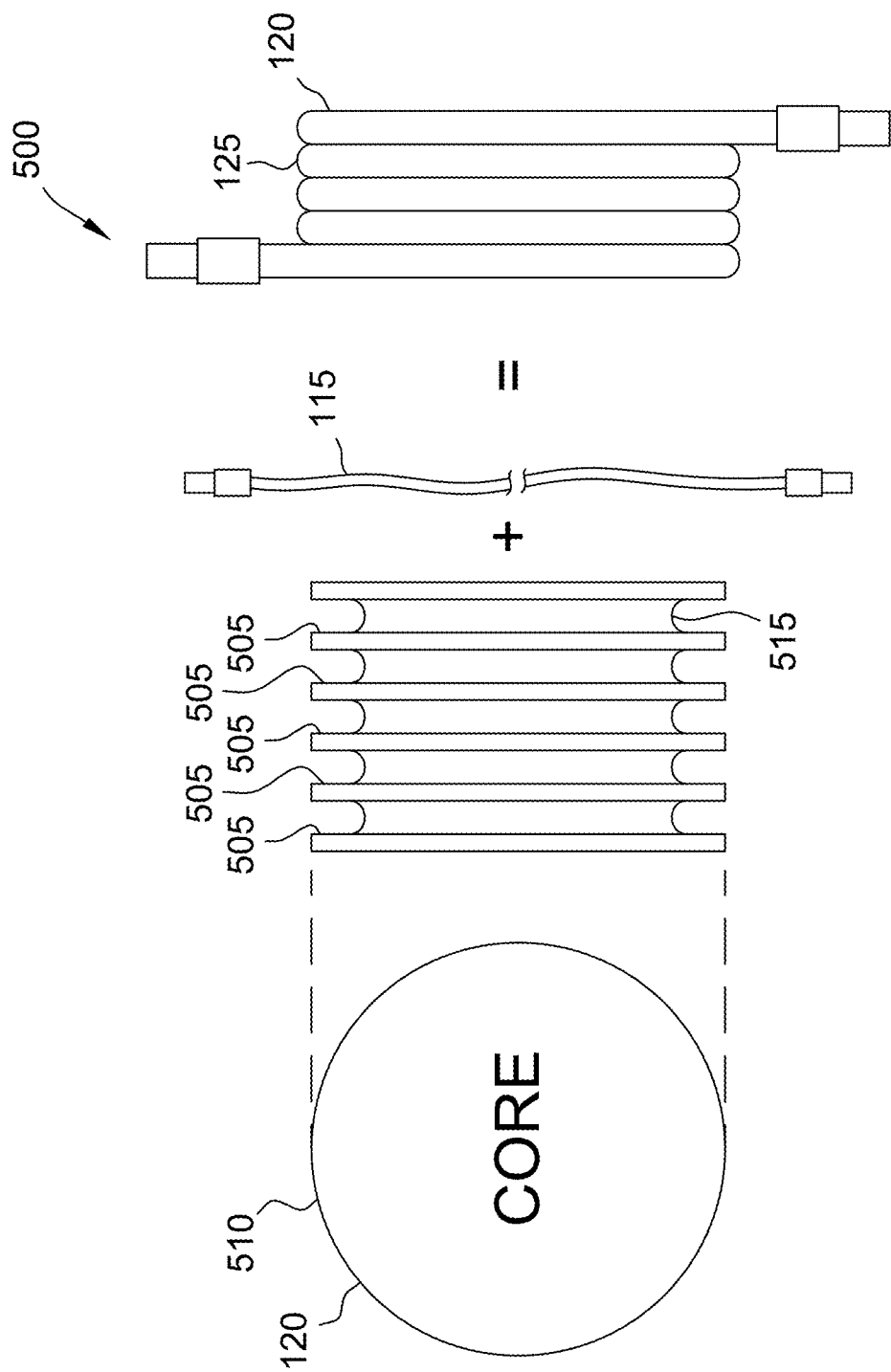
FIG. 5 is an illustration of a first configuration for transforming a charging cable into the wireless charging systems shown in FIGS. 1 and 2.

FIG. 5 is an illustration of a first configuration 500 for transforming a charging cable 115 into the wireless charging systems 100 and 200 (shown in FIGS. 1 and 2). In configuration 500, the core 120 includes a plurality of guides 505. These guides 505 can be shaped as grooves or indentations to allow a user to wrap their charging cable 115 around the core 120. The guides 505 not only show the user where to wrap their charging cable 115, but also can assist in holding the charging cable 115 in place. The guides 505 also allow the user to remove the charging cable 115 from the core 120, such as when the wireless charging is not currently needed or the charging cable 115 is needed elsewhere. In some embodiments, the guides 505 circle around the core 120 in a corkscrew formation to allow the user to wind their charging cable 115 into one continuous coil 125.

In some embodiments, the core 120 includes a housing 510, such as one made of plastic to contain and protect a ferrous material 515. In some embodiments, the direction of winding of the charging cable 115 is based on the position of the ferrous material 515 of the core the housing 510.

In some additional embodiments, the guides 505 also include a cut-out in the top and/or bottom of the housing 510 to allow the charging cable 115 to be secured so that the coil 125 does not accidentally unravel or come loose.

Figure 6:
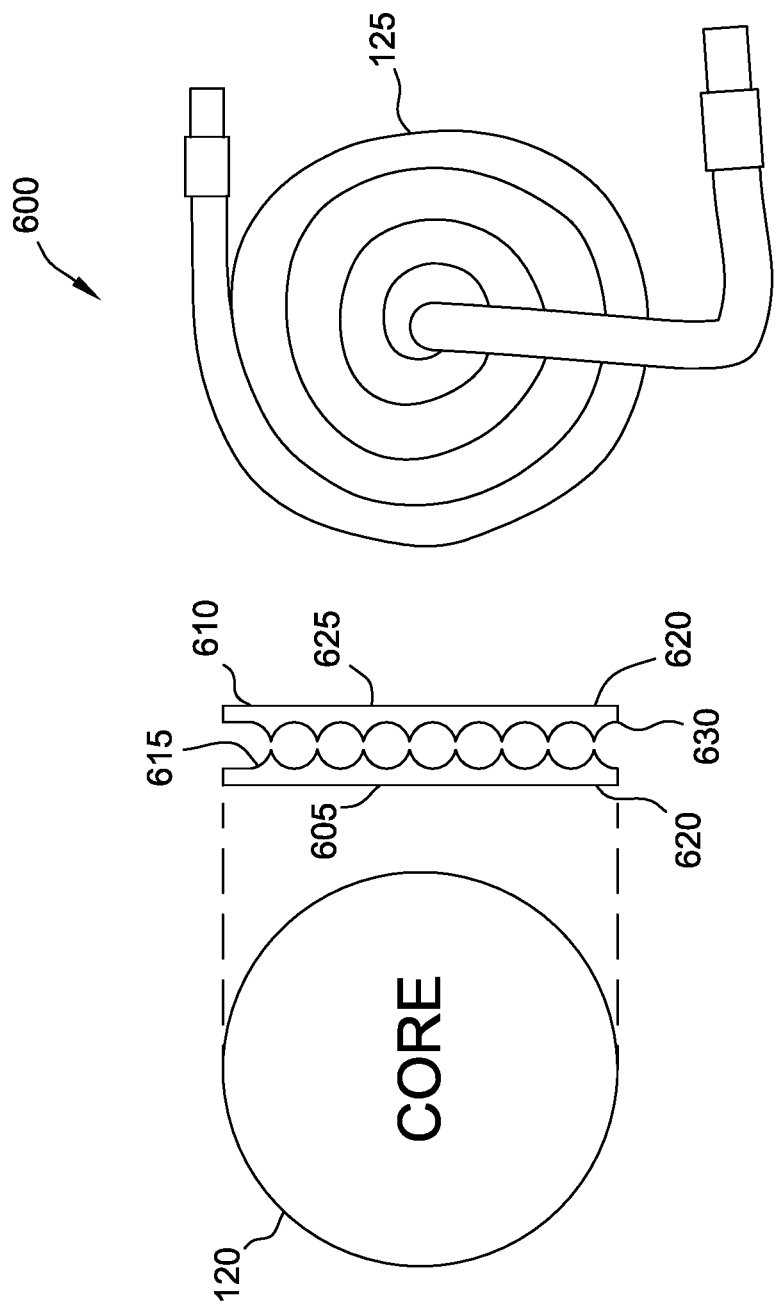
FIG. 6 is an illustration of a second configuration for transforming a charging cable into the wireless charging systems shown in FIGS. 1 and 2.

FIG. 6 is an illustration of a second configuration 600 for transforming a charging cable 115 into the wireless charging systems 100 and 200 (shown in FIGS. 1 and 2. In configuration 600, the core 120 includes a first side 605 and a second side 610, where the charging cable 115 is sandwiched between the first side 605 and the second side 610.

In configuration 600, both first side 605 and second side 610 include a plurality of guides 615. These guides 615 can be shaped as grooves or indentations to allow a user to wrap their charging cable 115 into a spiral formation coil 125 as shown in configuration 600.

In some embodiments, the first side 605 and the second side 610 each include a housing 620 enclosing ferrous material 625. Furthermore, the housings 620 also include a plurality of guides 615. The guides 615 not only show the user how to coil their charging cable 115, but also can assist in holding the charging cable 115 in place. The guides 615 also allow the user to remove the charging cable 115 from the core 120, such as when the wireless charging is not currently needed or the charging cable 115 is needed elsewhere. In some embodiments, the guides 615 cause the charging cable 115 to coil in either a clockwise or counter-clockwise manner.

In some embodiments, the housing 620 is made of plastic to contain and protect the ferrous material 625. In some embodiments, the direction of winding of the charging cable 115 is based on the position of the ferrous material 625 of the core 120 the housing 620.

In some additional embodiments, the guides 615 also include a cut-out in the first side 605 and/or the second side 610 to allow the charging cable 115 to be secured so that the coil 125 does not accidentally unravel or come loose. The cut-out can also allow the charging cable 115 to pass through the corresponding side 605 or 610.

Furthermore, the core 120 may include one or more hinges or clasps 630 to secure the first side 605 and the second side 610 to each other and keep the coil 125 from unraveling.

In some embodiments, the core 120 may include additional parts such as a platform to place the first electronic device 130. In some further embodiments, the housing 510 or 620 may include additional features to align the transmission coil 305 with the receiving coil 310 of the first electronic device 130 being charged. This may include, but is not limited to, markings on the housing 510 or 620, physical guides to place the electronic device 130, and/or magnets to help the electronic device 130 instruct the user as to where to place the electronic device 130 for the most efficient charging.

In some other embodiments, the core 120 may include indicators that let the user know when the wireless charging is active and not active. For example, an LED could be positioned to be powered when the coil 125 is providing power. Other indicators can be used as necessary.

Figure 7:
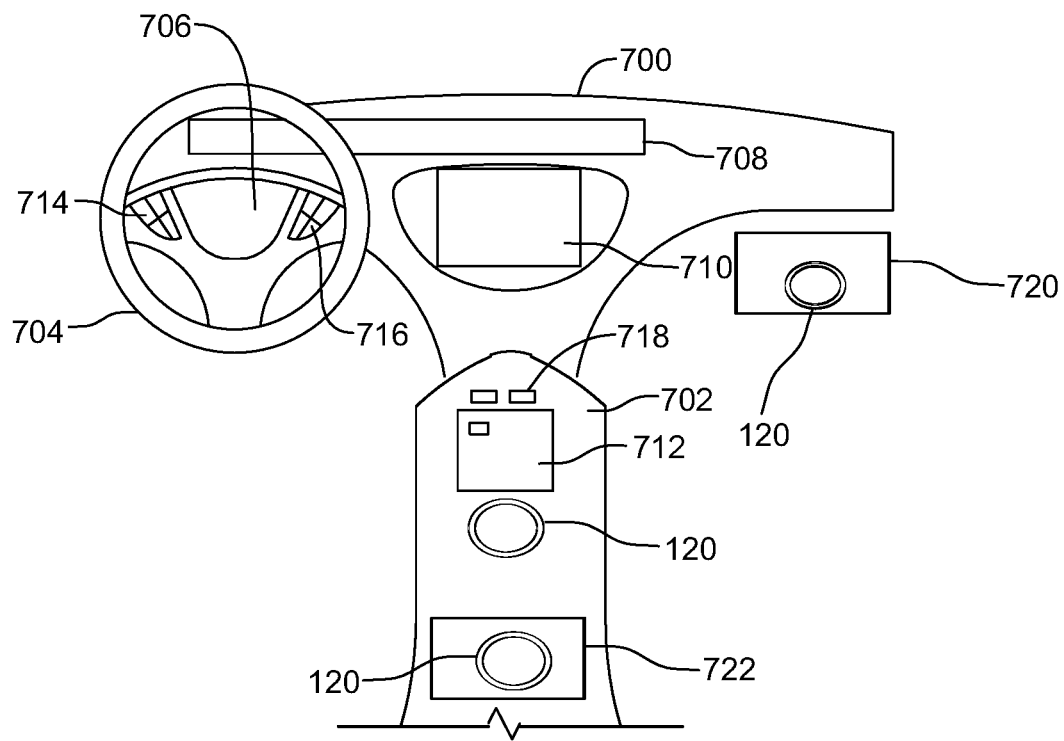
FIG. 7 is a partial schematic view of a vehicle.

FIG. 7 is a partial schematic view of a vehicle including a dashboard 700, a center console 702, and a steering wheel 704. In an exemplary embodiment, the vehicle can include multiple display screens, such as, but not limited to, steering wheel display 706, elongated display 708, and additional display 710. A steering wheel display 706 is in the center of the steering wheel 704, such that the user may easily glance down at the information on the steering wheel display 706 without being distracted from operating the vehicle.

An elongated display 708 is at a central portion of the dashboard 700 such that a user, or an operator/driver, of a vehicle may easily view the elongated display 708 without being distracted from operating the vehicle. The elongated display 708 may be located close to the user's eye level to enable the elongated display 708 to be viewed peripherally while the user is viewing the roadway ahead. In other embodiments, the elongated display 708 extends along the dashboard 700 such that a portion of elongated display 708 is behind the steering wheel 704. In other embodiments, the elongated display 708 may be at other locations within the vehicle. In another embodiment, the elongated display 708 extends along the dashboard 700 from behind the steering wheel 704 to the right edge of the center console 702. In some of these embodiments, there is an additional display 710 in the center of the dashboard 700 below the elongated display 708. The elongated display 708 is configured to be divided to provide multiple views and different types of information, such as, but not limited to, navigation, messaging, videos, audio and video communication, music, and others.

A touchpad 712 may be located next to the user of the vehicle. The touchpad 712 is positioned to be easily reachable by the user while operating the vehicle. In some embodiments, the touchpad 712 may be located in a center console area 702 next to the user. The touchpad 712 enables the user to select icons displayed on at least one of the elongated display 708 and/or the additional display 710. In some embodiments, the steering wheel 704 include a left keypad 714 and a right keypad 716, where each keypad 714 and 716 include one or more buttons. In addition, touchpad 712 may include one or more physical buttons 718 or be positioned proximate to one or more physical buttons 718.

A wireless charging core 120 may also be attached to the center console 702. This is to allow the user to wind their charging cable 115 around to wirelessly charge one or more electronic devices 105 (all shown in FIG. 1). In some embodiments, the wireless charging core 120 is removably attached to the center console 702. In other embodiments, the wireless charging core 120 is integrally formed into the center console 702. The wireless charging core 120 can also be attached to other portions of the dashboard 700 and or the console 702. This attachment can be permanent or removably attached.

The vehicle may also include a storage area in or attached to the dashboard 700, such as a glove box 720. The glove box 720 may include a wireless charging core 120 as described herein. The wireless charging core 120 may be removably attached to the glove box 720 and/or the dashboard 700.

Furthermore, the vehicle may include one or more armrests that cover one or more armrest compartments 722. The armrest compartments 722 may include one or more wireless charging cores 120. The wireless charging cores 120 may be removably attached to the armrest compartments 722. The armrest compartments 722 can include other types of storage compartments in the vehicle.

The above-described wireless charging system provides a transmission coil that may be created with a core and a charging cable, which is agnostic to the specific charging cable provided.

The methods and systems described herein may be implemented using computer programming or engineering techniques including computer software, firmware, hardware or any combination or subset thereof, wherein the technical effects may be achieved by performing at least one of the following steps: (a) transferring electrical power from an electrical power source to a transmission coil to and then to wirelessly charge a device; (b) allow for a user to charge an electronic device even with a charging cable that will not properly attached to the electronic device; and (c) transferring electrical power from the transmission coil to a receiving coil in the portable electronic device.

Exemplary embodiments of a wireless charging systems are described above in detail. The methods and systems are not limited to the specific embodiments described herein, but rather, components of systems and/or steps of the method may be utilized independently and separately from other components and/or steps described herein. Each method step and each component may also be used in combination with other method steps and/or components. Further, each step of any method described herein may be performed in any order. Although specific features of various embodiments may be shown in some drawings and not in others, this is for convenience only. Any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A wireless charging device for use in providing electrical power to one or more portable electronic devices, the wireless charging device comprising:
   a ferrous core; and
   a housing surrounding the ferrous core, wherein the housing includes a plurality of guides that align a cable and are disposed on an external surface of the housing, wherein when the cable is aligned in the plurality of guides upon the external surface of the housing and a current is passed through the cable, the cable and the ferrous core act as a transmission coil to transmit power from an electrical power source to at least one receiving coil in a first portable electronic device.

2. The wireless charging device of claim 1, wherein the cable includes a first end, wherein the first end is attached to the electrical power source.

3. The wireless charging device of claim 2, wherein the cable also includes a second end, wherein the second end is attached to a second portable electronic device, wherein the cable is transmitting power from the electrical power source to the second portable electronic device.

4. The wireless charging device of claim 2, wherein the cable also includes a second end, wherein the second end is attached to a cap that completes a circuit to the electrical power source.

5. The wireless charging device of claim 1, wherein the housing is shaped in a cylinder and wherein the plurality of guides align the cable to be wrapped around the external surface of the housing a plurality of times.

6. The wireless charging device of claim 1, wherein the housing includes a first part and a second part, wherein the first part and the second part include the plurality of guides, wherein the plurality of guides align the cable to be in a spiral formation.

7. The wireless charging device of claim 6, wherein the first part includes the ferrous core.

8. The wireless charging device of claim 6 further comprising a first ferrous core and a second ferrous core, wherein the first part includes the first ferrous core and the second part includes the second ferrous core.

9. The wireless charging device of claim 6, wherein the housing further includes at least one of a hinge or a clasp to attach the first part to the second part.

10. The wireless charging device of claim 1, wherein the cable is detachable from and independent of the housing.

11. The wireless charging device of claim 1, wherein the wireless charging device is attached to a vehicle.

12. The wireless charging device of claim 11, wherein the wireless charging device is attached to one of a dashboard, a center console, a glove box, or a storage compartment of the vehicle.

13. The wireless charging device of claim 11, wherein the wireless charging device is removably attached to the vehicle.

14. A wireless charging system comprising:
   one or more portable electronic devices, wherein a first portable electronic device of the one or more portable electronic devices comprising at least one receiving coil and a battery;
   a cable; and
   a wireless charging device including a ferrous core, the wireless charging device configured to have the cable coiled around an external surface of the wireless charging device in proximity to the ferrous core, and when the cable is coupled to an electrical power source, the cable and the wireless charging device act as a transmission coil configured to be inductively coupled to the at least receiving coil.

15. The system of claim 14, wherein the cable includes a first end, wherein the first end is attached to the electrical power source.

16. The system of claim 15, wherein the cable also includes a second end, wherein the second end is attached to a second portable electronic device, wherein the cable is transmitting power from the electrical power source to the second portable electronic device.

17. The system of claim 15, wherein the cable also includes a second end, wherein the second end is attached to a cap that completes a circuit to the electrical power source.

18. The system of claim 14, wherein the wireless charging device is shaped in a cylinder and wherein a plurality of guides align the cable to be wrapped around the external surface of the wireless charging device a plurality of times.

19. The wireless charging device of claim 14, wherein the wireless charging device includes a first part and a second part, wherein the first part and the second part include a plurality of guides, wherein the plurality of guides align the cable to be in a spiral formation.

20. The system of claim 19 further comprising a first ferrous core and a second ferrous core, wherein the first part includes the first ferrous core and the second part includes the second ferrous core.

* * * * *